United States Patent [19]
Gambino et al.

[11] Patent Number: 5,849,356
[45] Date of Patent: Dec. 15, 1998

[54] METHOD FOR DEICING HIGHWAYS USING STARCH-CONTAINING COMPOSITIONS AND STARCH-CONTAINING COMPOSITIONS ESPECIALLY DESIGNED FOR DEICING HIGHWAYS

[75] Inventors: James Gambino, Yardley, Pa.; Michel Janssen, Merchtem, Belgium; Hans-Jürgen Pierkes, Krefeld, Germany

[73] Assignee: Rheox, Inc., Hightstown, N.J.

[21] Appl. No.: 835,750

[22] Filed: Apr. 8, 1997

[51] Int. Cl.$^6$ ....................................................... B05D 5/10
[52] U.S. Cl. .............................. 427/136; 252/70; 106/13; 427/384
[58] Field of Search ..................................... 427/156, 384; 106/13; 252/70

[56] References Cited

U.S. PATENT DOCUMENTS

| | | | |
|---|---|---|---|
| 2,490,047 | 12/1949 | Gilchrist, Jr. et al. | 252/67 |
| 4,148,938 | 4/1979 | Hansen | 252/70 |
| 4,283,297 | 8/1981 | Peters et al. | 252/70 |
| 4,430,240 | 2/1984 | Sandvig | 252/70 |
| 4,954,279 | 9/1990 | Ma et al. | 252/70 |
| 5,427,705 | 6/1995 | Simper | 252/70 |
| 5,591,375 | 1/1997 | Lott et al. | 252/70 |

FOREIGN PATENT DOCUMENTS

| | | |
|---|---|---|
| 344564 | 9/1987 | Germany . |
| 838445 | 12/1988 | Germany . |
| 56-214383 | 12/1981 | Japan . |
| 022129 | 10/1989 | Japan . |

OTHER PUBLICATIONS

U.S. Army Corps of Engineers, *Anti–Icing Technology, Summaries of State Experiences*, FHWA Test and Evaluation Project No. 28, Aug. 1995.

*Anti–Icing/Roadway Weather Information Systems*, Lead State Team for SHRP Technology Implementation, Sep. 18–19, 1996.

*Primary Examiner*—Janyce Bell
*Attorney, Agent, or Firm*—Michael J. Cronin

[57] ABSTRACT

The invention hereof is a new highway deicing additive and a method for deicing asphalt highways. It has been discovered that a small amount of starch added to the salt/water sprayed on highways provides the unexpected property of retaining salt particles in the top portion of the "voids" in the asphalt roads for a period of 2 to 4 hours. The starch can be incorporated into water by mixing; biocides can be added if the starch/water mixture is to be stored more than 2 days. Salt is added to the water/starch mixture prior to deposition on the road. The new treatment works by increasing the viscosity of the aqueous fluid sprayed on the highway to form a water gel structure on the road providing a "platform" for the salt particles in the top portion of the asphalt. The new additive also reduces the need and cost of "follow-up" salt treatments.

The additive and method are particularly useful for the new type of asphalt being used on highways in Europe which has a super-porous structure when laid as a road-bed.

12 Claims, No Drawings

METHOD FOR DEICING HIGHWAYS USING STARCH-CONTAINING COMPOSITIONS AND STARCH-CONTAINING COMPOSITIONS ESPECIALLY DESIGNED FOR DEICING HIGHWAYS

BACKGROUND OF THE INVENTION

1. Brief Description of the Invention

The invention hereof is a new method for providing highways with deicing protection. The invention includes new highway deicing compositions. These compositions comprise a mixture of starch, water and salt in specified amounts. Depositing the new compositions on ice-impacted roadways provides a particularly effective method for protecting against and reducing the severity of icy and slippery conditions. The invention is especially useful on asphalt surfaces; more particularly useful on the newer types of highly porous asphalt roadways rapidly coming into use in Europe.

2. Description of the Prior Art

A new type of asphalt especially designed for road surfaces has been developed in Europe and has achieved rapid utilization in new road construction in the Benelux countries. This asphalt is coarse and more porous than past commercially-utilized asphalt. The enhanced porous nature of the new asphalt results in a large number of subsurface channels, when the asphalt is used as a highway coating, which allow rain to pass quickly away from the asphalt surface, through these porous subsurface channels, and then promptly dissipate into the underlying soil. The asphalt road surface itself retains practically no moisture, is almost immediately "dry", and is not slick and slippery during the most heavy rainstorms. This rain "safety" feature, along with the fact that the porous structure of the new asphalt significantly reduces road noise, has led to this new type of asphalt rapidly replacing existing types in Northern Europe. It is expected that such asphalt will be used extensively in the United States over the next decades particularly in the New England and upper Midwest and North Central States on both new roads and as a replacement covering on existing highways. Since United States highways have useful lifes of 40 to 50 years, replacement is expected to be gradual but sustained.

Asphalt in the past has been made of bitumen and a mixture of coarse and small stones. The small stones "fill" the holes between the coarse stones with the bitumen "flowing" around both sets of stones. The newer asphalt contains far fewer smaller stones. As the bitumen flows around the coarse stones, it forms a far larger number of random channels than in traditional asphalt.

The new asphalt, while excellent as to rain protection, has a flaw when it comes to icy conditions and snowy weather, common in Northern Europe and the Northern United States in the winter. In Europe, asphalt roads have long been treated during and after storm conditions by road maintenance departments. Recently, each time an icy weather forecast was received, pretreatment with a salt/water coating of salt particles in water to alleviate the expected icy road conditions has become more common. This type of road condition is most dangerous when the ground temperature is below freezing and the air temperature above freezing. Pre-treatment is usually applied 1 or 2 hours before a rain or snow storm hits or the described temperature condition commences.

Treatments for deicing vary between the United States and Europe. State traffic authorities in America largely use salt by itself, spreading the salt onto the roadway surface in essentially solid, granule form. In recent years dry mixtures, most particularly rock salt, salt and sand have been used, with some U.S. highway departments recently "prefluidizing" or "prewetting" the salt or the salt and sand mixture with a small amount of water. In Europe, most Northern Europe highway maintenance trucks contain aqueous slurry apparatus which either contain a water/salt slurry when the truck leaves its garage, or which mix salt and water together, often immediately before spraying the mixture onto highways. The combination is typically 70% salt and 30% water. This traditional treatment in Europe has proved ineffective in some cases and dangerous with the new asphalt roadways, however, as the salt/water mixture used quickly flows through the porous asphalt into the soil, and is not available at the surface when icy conditions commence.

For purposes of this invention, the two above detailed methods can be described as pre-treatment and post-treatment, and both are included in the term, "deicing". For completeness of understanding, "pre-treatment" is a strategy to retard or prevent the formation of any bond between ice and the pavement surface. By applying salt, often more broadly referred to as ice control chemicals, before or at the very beginning of a storm before ice conditions occur, it often is possible to prevent any icing from ever happening, and in fact reduce the total amount of ice control chemicals required; the goal is to provide a higher level of service to the traveling automotive public. "Post-treatment" is a highway maintenance strategy used to "break" the already-formed bond between formed ice and the roadway pavement, which has been established because of, and after, the onset of icy conditions. Post-treatment often includes a second deposit of ice control chemicals on an already pre-treated road surface. Obviously, this technique is required once a roadway pavement becomes covered with snow or ice. In post-treatment, more salt is required to cut through the ice and break the formed bonds than is needed (through pre-treatment) to prevent the initial formation of the ice to roadway surface bond.

The most efficient use of the instant invention is as pre-treatment process and product. The motivation for developing pre-treatment deicing compositions and methods include:

1. Safety concerns. Automotive safety improvement is a key mission of most governmental agencies. Reducing deaths and injuries by preventing ice from even forming on a highway is a goal worth striving to achieve.

2. Environmental concerns. By reducing salt usage with its abrasive and corrosive effect, there will be reduced environmental impact. Salts and their use on highways are often challenged by concerned environmental organizations.

3. Faster recovery of desirable automotive pavement friction (improved traction and stopping distance).

4. A reduction in the amount of salt used. Preventing ice from bonding to the pavement delays, or reduces, the need for heavier post-treatment deicing salt applications.

5. Marketing of improvements presents opportunities. As less chemicals are used, and highway maintenance agency/departments avoids higher costs for deicing, there is a potential for cost savings for the agency. This is a marketing tool for both manufacturers of deicing materials and slurry equipment especially in a era of governmental budget reductions.

Highway maintenance departments, particularly in Northern Europe, have been on a search for an alternative highway deicing method, and products to support such method of pre-treating, for use on all roads, including both traditional roads and those roads using the newer type of asphalt. Dutch highway authorities, particularly, are involved in the testing of a variety of new additives. Several other companies, some of which may have developmental products, are believed to be providing products for consideration by the Netherlands highway authorities.

The field of deicing itself has long been the subject of scientific inquiry. As an introduction, the following is a brief statement or explanation of the manner in which "salt" melts ice. This is not intended to be a complete scientific explanation, but only a broad overview of the physical chemistry involved in use of the inventive method of this invention.

The physical characteristic of salts, such as the chlorides, which enables them to prevent and remove ice from highways is their ability to lower the freezing point of water and thus reverse and prevent the formation of ice. This lowering of the freezing point is caused by a lowering of the vapor pressure of the solution on the highway's surface. Whenever a chemical exists in two states which are in contact with each other, as for example water and ice, there is a constant interchange of molecules between the two states. This interchange of molecules creates what is known to scientists as vapor pressure.

If the vapor pressure of the solid is greater than that of the liquid, more molecules will leave the solid state than will return and the solution will become more liquid; conversely, if the vapor pressure of the liquid is greater than that of the solid, more molecules will enter the solid state than will leave and the solution will become more solid. The freezing point is that point at which the vapor pressure of the liquid equals the vapor pressure of the solid.

In a solution, if the solute (material being dissolved) is more soluble in the liquid than in the solid, the solute molecules will remain in the liquid, resulting in fewer molecules of solvent for a given volume, and hence a lower vapor pressure. When the vapor pressure of the liquid becomes lower than that of the solid, the solid state will change to liquid until a new equilibrium point is reached. The two most commonly used salts, calcium chloride and sodium chloride, are more soluble in water in the liquid state than in the solid state.

Vapor pressures decrease with a decrease in temperature and values for pure ice and for pure water have been determined for various temperatures. The amount of reduction in vapor pressure caused by the addition of various solutes has been also determined. Calculations of this type have been made and show, for example, a 10 percent calcium chloride solution has a freezing point of approximately −5.5° C., while a 10 percent sodium chloride solution has a freezing point of approximately −7° C. This indicates a slightly greater lowering of the freezing point by sodium chloride than by calcium chloride in 10 percent solutions; there are more ions present per gram in sodium chloride. This difference may also be explained by the difference in solubility of the two chemicals at lower temperatures.

Chemicals dissolved in water lower the freezing point by lowering the vapor pressure of the mixture. With a lower vapor pressure in the solution on the highway, the molecules comprising the solid (ice) migrate into the solution (water), resulting in melting of the ice. Any chemical that dissolves in water can be used with this invention—particularly useful salts are defined hereafter. The salt's molecular weight, number of ions, solubility and cost determine its usefulness and ice-melting effectiveness. Salts generally must be in a liquid phase before they can melt or effect ice.

There is a great deal of scientific interest in the deicing of highways. The Federal Highway Administration, a part of the U.S. Department of Transportation, has a Test and Evaluation project (Project No. 28) which in August of 1995 published *Summaries of State Experiences-Anti-Icing Technology*. This publication shows the diversity in approaches and widespread concern of responsible state DOT organizations in protecting the public from the adverse effects of storms and icing After its Sep. 18–19, 1996 meeting at St. Louis, Mo., the AASHTO Conference of Lead States for Implementation of SHRP Technologies published a thorough Strategy and Action Plan as to anti-icing/roadway/weather information systems.

The patent art is also diverse. Corn and wheat starches have allegedly been found useful as ingredients to treat ice to give ice effectively a longer cooling time and to prolong the ice's melting time—see U.S. Pat. No. 2,490,047. Salt compositions for deicing are the subject of U.S. Pat. Nos. 5,427,705, 5,324,442, 5,135,674 and European Patent Application No. 370-358A. Mixtures of ingredients for deicing are described in U.S. Pat. Nos. 4,606,835, 4,388,203 and 4,283,297. Such ingredients as carboxyl methyl cellulose (U.S. Pat. No. 4,148,938), limestone (Japanese Patent No. 1198-677a) and urea/casein (German Patent No. 3344-654-A) have been disclosed as useful as deicing chemicals.

The inventors herein have discovered that a small amount of starch, when added to the water of salt/water mixture sprayed on highways, will provide the unexpected property of retaining salt particles in the top portion of the "voids" in the new asphalt roads for a period of 2 to 4 hours. The starch can be incorporated into water by mixing for about 30 minutes or less; biocides can be added if the starch/water mixture is to be stored more than a day or so. The new treatment works by increasing the viscosity of the fluid to form a water gel structure which allows the salt/water particles to remain hanging in the top portion of the asphalt holes. The tires of traffic ensure a continuous contact between the salt and the falling rain, sleet or snow. The new additive, since it is retained in suspension in the asphalt, reduces the need and cost of "follow-up" salt treatments. Salt has long been questioned because of its residual effect on the environment. The new method and composition, while particularly effective for new asphalt roadways, provide as well effective deicing improvements for treating traditional asphalt and concrete roadways—especially being effective where roads have been grooved by highway authorities to provide water runoffs as are common in the Midwestern states. Application of the new compositions to these grooved areas is effective in maintaining the salt in the grooves longer than present systems.

Wheat-based starches and derivatives have been found particularly effective for use in the present invention. These starches have the additional advantage of being especially biodegradable, and to be particularly resistant to salt degradation.

OBJECT OF THE INVENTION

It is an object of this invention to provide a workable and effective deicing method and composition that will provide effective deicing to asphalt roads and provide motorists with as safe a road as can be achieved under ice conditions.

It is a further object of this invention to provide such a method and composition using relatively inexpensive, widely-available components, which will be particularly effective for providing safe roads of the new type of superporous asphalt used on highways in Northern Europe.

It is a still further object of this invention to provide a new method of deicing roadways by spraying on such roadways a defined combination of starch, salt and water.

DESCRIPTION OF THE REFERENCED EMBODIMENTS

The inventive method of this invention in a preferred embodiment involves providing deicing capability to highways and roads:

by providing an additive composition comprising:
a) from about 10% to about 97% water at a temperature of 65° C. or less,
b) from about 0.5% to about 30% starch and,
c) from about 5% to about 90% salt.
and then depositing the additive composition on the road at a time no more than about two to three hours prior to the commencement of icy climatic conditions.

The additive composition for providing deicing capability to roads of this invention in a preferred embodiment comprises:

a) from about 10% to about 97% water,
b) from about 0.5% to about 30% starch and,
c) from about 5% to about 90% salt.

All percentages are calculated by volume and are relative one to another of the components. Mixtures of different starches and salts can be used.

Starch useful, for purposes of this invention, can be selected from a broad group of available products as described hereafter. When the term starch is used herein, it means both natural starch and the wide variety of starch derivatives and modifications enumerated below.

Starch is a carbohydrate polymer having the following repeating unit:

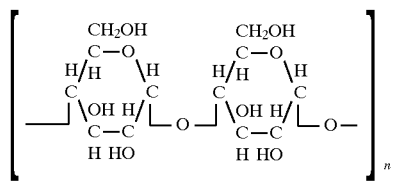

Starches vary largely in the number of the repeating unit (n) in the polymer, which to a major extent depends on the source of the starch. Starch is normally composed of about 25% amylose and 75% amylopectin. Amylose is currently considered by scientists as a mixture of linear and slightly branched molecules whereas amylopectin is considered a densely branched, high molecular weight molecule. In some cereal starches, the amylose content can be as low as 0–1% as in waxy barley, waxy sorghum, and waxy corn and can be as high was 50–70% in some corn hybrids.

Starch is often described as a repeating polymer of glucose units linked together by glycosidic bonds. Starch is actually a reserve polysaccharide obtained from plants (wheat, corn, potato, tapioca and rice are common commercial sources). Without the various modifications discussed below, starch is a white, semi-crystalline, tasteless powder often in granule form. When starch is put in hot water in sufficient amount, say at a temperature of 65° C. or higher, irreversible gelatinization can occur. Swelling of starch granules can be induced at lower temperatures by the addition of such compounds as formamide, formic acid, and strong bases and certain metallic salts.

A large number of pure starch grades are available including those commonly referred to as commercial, powdered, pearl, laundry, technical and edible.

Starch has many uses. Some common uses include as adhesives (gummed paper and tapes, cartons, bags, etc.), as textile filler and sizing agents, as beater additives in papermaking, as gelling agents and thickeners in food products (for example, gravies and desserts), as additives in oil-well drilling fluids, as fillers in baking powders (corn starch), as fabric stiffeners in laundering of shirts, as urea-formaldehyde resin adhesives for particle board and fiberboard, as explosives for military use (nitrostarch), as dextrin (starch gum) and as chelating and sequestering agents in foods. Starch is used as an indicator in analytical chemistry, as an anticaking agent in sugar, and as a face powder. Starches are easily available from many suppliers and have the advantage for this invention of generally being of relatively low cost, of a non toxic, food-like nature and easily handable.

Also useful in the invention are products derived from starch. Such derived products are generally called modified starches. Modified starches include starch-based polymers, and cross-linked, substituted, phosphated oxidized, acid-thinned and other types of chemical modifications—all of these products are included within the meaning in this application of the term starch.

The Code of Federal Regulations, which is incorporated herein by reference, describes in detail starches and modified starches intended for industrial or food applications. For example, 21 CFR 172.892 describes modification of starch for food use and 21 CFR 178.3520 covers the modification of starch for industrial applications.

Starch-based polymers are reaction polyols derived from a reaction, using catalysts, of a starch with dibasic acids and hydrogen-donating compounds dissolved in a water slurry; the slurry is subjected to high temperatures and pressures, yielding a low-viscosity polymer in an aqueous solution. Molecular rearrangement takes place, and the starch-derived polymer formed can be very different from natural starch in structure. The polymer can be further reacted with acids, bases, and cross-linking agents.

Starch derivatives include refined carbohydrates produced by wet-processing. There are then physically modified and destructured by heat processing to increase water absorption and viscosity.

Very useful for this invention are starches derived from wheat distributed by Rheox Inc. Particularly useful are the Rheox products bearing the commercial designations EA-2566 and EA-2567. EA-2566 is an instant or pregelatinized starch obtained by physical modification of wheat starch in a drum drier. EA-2567 is a "cook-up" substituted wheat starch that obtains high viscosity when heated in water. When hydrated at room temperature, EA-2566 forms more of a viscous composition whereas EA-2456 yields a milky white aqueous suspension composition.

Also included in the invention are other starch derivatives including starch dialdehydes. These are starches in which the original anhydroglucose units have been partially changed to dialdehyde form by oxidation, for example, the product of the oxidation of corn-starch by periodic acid.

Also useful are water-soluble polymers derived from a starch (wheat, corn, potato, tapioca) by acetylation, chlorination, acid hydrolysis, enzymatic or other reactions. These reactions yield starch acetates, esters, and ethers in the form of stable and fluid solutions and films. The effect of this treatment is a chemically modified glucose backbone with functional groups attached thereto. Modified starches have been used as food thickeners, textile sizing agents, drilling fluid viscosifiers and as thickeners for paper coatings. Thin boiling starches have high gel strength, and oxidized starches made with sodium hypochlorite have low gelling tendency. Introduction of carboxyl, sulfonate, or sulfate groups into starch gives sodium or ammonium salts of anionic starches, yielding clear, non-gelling dispersions at relatively high temperatures. Cationic starches result from addition of positively charged amino groups.

The glucose units of starch can also be crosslinked with such agents as formaldehyde, phosphorous oxychloride, soluble metaphosphates, and epichlorohydrin to form useful cross linked products; this increases the shear stability and thickening power of the starch ingredient which is most desired for the practice of this invention.

Particularly useful are starch phosphates. These are esters that, in one process, are made from the reaction of a mixture of orthophosphate salts (sodium dihydrogen phosphate and disodium hydrogen phosphate) with a wide variety of starches. The product when gelatinized has excellent thickening power.

It is to be understood that some of the above enumerated categories of modified starch chemicals overlap in definition depending on which scientist or which company is describing their products. It is also to be understood that the starch can be incorporated into the inventive composition in a prepared liquid already containing water.

The starch/water/salt mixture may be frozen and thawed repeatedly without change in physical properties; this is particularly desirable by road maintenance departments.

The term salt used in this invention includes its common meaning of sodium chloride. In addition, salt is broadly defined for purposes of this invention to include chemicals which are often substituted by highway maintenance departments for sodium chloride including calcium chloride, magnesium chloride, aluminum chloride, ammonium sulfate, calcium acetate, calcium magnesium acetate, ice phobic coatings, lithium chloride, magnesium acetate, potassium acetate, potassium carbonate, potassium bicarbonate, potassium chloride, potassium phosphate, sodium formate, sodium nitrate, sodium sulfate, South Dakota "X", tetrapotassium pyrophosphate, and urea; salt/sand mixtures, and chemical deicers such as CG-90 used by the Colorado DOT.

Preferred forms of salt for use in this invention are the various grades of sodium chloride, rock salt, and calcium chloride salt currently used for highway maintenance and deicing in Europe and the United States. The sodium chloride salts generally are soluble in water and for purposes of this invention it is preferred that an amount of salt be utilized which forms a slurry with the water used. Such aqueous slurry is composed of solubilized salt and salt in a dispersed solid non-solubilized form. Useful sodium chlorides for this invention can be obtained from the Canadian Salt Company, AKZO Nobel NV (Salt Divison), Morton International Inc., and Leslie Salt Company among others.

The water useful in this invention is water as broadly known. Any source or type of water currently used by highway authorities is useful. The water can come from almost any source. The water used itself may contain small amounts of other ingredients including small amounts of salt to prevent its freezing.

The method of this invention can be accomplished using slurry dispersing equipment commonly available on trucks used by highway maintenance crews in Europe and less often by crews in the United States. The composition can be sprayed on highway surfaces using this equipment preferably no more than 2 to 3 hours before icy conditions are expected. Spraying or depositing can occur even on asphalt and concrete roads already covered in whole or in part with ice or which has already been treated using the method of this invention. Repeated treatments are also possible. An advantage of the invention is that the deicing composition after fulfilling its mission, will itself rapidly disappear from the highway into the soil. Since starch, salt and water are all relatively benign substances, no pronounced adverse impact to the environment occurs with use of the new method. Since less salt is used in most cases, the environmental impact will in fact be reduced.

The following examples are illustrations designed to assist those skilled in the ink art to practice the present invention, but are not intended to limit the wide scope of the invention. Various modifications and changes can be made without departing from the essence and spirit of the invention. The various chemicals used in the examples are commercial materials, except for the inventive compositions.

EXAMPLE 1

Procedure of the evaluation

Six percent (6%) of a starch derivative was dispersed in water (10 minutes at 16 m/sec peripheral speed of the 4 cm toothed disc). The modified starch used was EA-2566, a Rheox wheat-derived starch derivative. Two suspensions with salt (sodium chloride) were produced:
1) Reference suspension—
   70 parts by weight salt
   30 parts by weight water
2) Suspension with starch derivative—
   70 parts by weight salt
   30 parts by weight of an aqueous suspension of water and a starch derivative (a biocide of 0.2–0.4 % Parmetol A 26, was also used)—the amount of the starch used equaled 1.8% by volume of the overall total suspension)

These two suspensions were then used to run the following trials.

Settling behavior 100 ml of the suspensions were filled into a graduated cylinder and settling of salt was assessed as a function of time.

Result:

The salt completely settled down within as short a period as 10–15 minutes in the suspension which contained only salt and water. The suspension with modified starch remained almost stable for ten minutes—after two hours, 30% of the salt had settled.

EXAMPLE 2

Application onto asphalt

The suspensions were sprayed onto asphalt by means of a spray bottle and an assessment was made of the distribution on a highway porous asphalt.

Result:

The reference suspension could only partly be sprayed because the salt settled so rapidly. The salt rapidly sank into the pores of the asphalt, leaving mostly water as the top layer. Distribution on the asphalt was very inhomogeneous.

The inventive mixture was more readily sprayed, formed a homogeneous layer on the asphalt and did not sink through the pores. It retained the salt in place to perform its deicing function.

EXAMPLE 3

Behavior in a freezer

An asphalt block was sprayed with 20 ml water after application of the inventive suspension. The asphalt block and suspension were then stored in a freezer at $-10°$ C., $-15°$ C. and $-20°$ C.

Result:

At −10° C. and −15° C., no ice formation was observed either on the asphalt block or in the suspension. The asphalt block treated with the inventive suspension showed a few traces of ice at −20° C. at spots with inadequate distribution of the salt suspension—the suspension proper did not show ice formation.

Discussion of Results

The above three examples show that the addition of starch to a salt/water mixture can efficiently prevent the settling of salt. In practice, this results in a better distribution of the salt solution and a longer dwell time on the coarse asphalt surface. The use of the inventive composition retarded the absorption or sinking of salt into the deep pores of the asphalt. Moreover, according to the above findings, the addition of starch had no adverse influence on the capacity of the salt to lower the freeze point of water.

It was also observed in tests not shown above that a 6% solution of starch degraded in a salt/water suspension within two days. Addition of a small amount of biocide preserved the solution for an extended period.

The foregoing background, description and examples have been set forth merely to illustrate the invention and are not intended to be limiting. Since many modifications and simple changes of the disclosed embodiments incorporating the spirit and substance of the invention may occur to persons skilled in the art, the invention should be construed to include everything within the scope of the appended claims, equivalents thereof and obvious variations thereof.

What is claimed:

1. A method of providing deicing capability to roadways subject to icy climatic conditions comprising:
    a) providing an additive mixture composition at a temperature of 65° C. or less comprising:
        i) from about 10% to about 97% water,
        ii) from about 0.5% to about 30% starch and,
        iii) from about 5% to about 90% salt, and then
    b) depositing the additive composition on a roadway.

2. The method of claim 1 wherein the starch is a modified starch.

3. The method of claim 2 wherein the starch is wheat-derived.

4. The method of claim 1 wherein the salt is selected from the group consisting of sodium chloride, calcium chloride, magnesium chloride, aluminum chloride, ammonium sulfate, calcium acetate, calcium magnesium acetate, ice phobic coatings, lithium chloride, magnesium acetate, potassium acetate, potassium carbonate, potassium bicarbonate, potassium chloride, potassium phosphate, sodium formate, sodium nitrate, sodium sulfate, tetrapotassium pyrophosphate, and urea.

5. The method of claim 4 wherein the salt is selected from the group consisting of sodium chloride and calcium chloride.

6. The method of claim 1 wherein the additive composition is deposited on the roadway in whole or in part by spraying.

7. The method of claim 1 wherein the roadway is made of highly porous asphalt.

8. The method of claim 1 wherein the additive composition is deposited on the roadway before the commencement of icy climatic condition.

9. The method of claim 1 wherein the additive composition contains as an additional ingredient about 1% or less of a biocide.

10. An additive mixture composition especially designed for providing deicing capability to roadways comprising:
    a) from about 10% to about 97% water,
    b) from about 0.5% to about 10% starch and,
    c) from about 5% to about 90% salt selected from the group consisting of sodium chloride and calcium chloride.

11. The composition of claim 10 wherein the starch is a modified starch.

12. The composition of claim 10 wherein the additive composition contains as an additional ingredient about 1% or less of a biocide.

* * * * *